United States Patent Office 3,726,708
Patented Apr. 10, 1973

3,726,708
PROCESS OF PRODUCING A COMPOSITE PHENOLIC RESIN FOAM ARTICLE AND RESULTANT ARTICLE
Franz Weissenfels, Siegburg, and Hans Jünger, Troisdorf, Germany, assignors to Dynamit Nobel Aktiengesellschaft, Troisdorf, Germany
No Drawing. Filed June 22, 1970, Ser. No. 59,788
Claims priority, application Germany, June 23, 1969, P 19 31 776.1
Int. Cl. B32b 5/18, 11/06
U.S. Cl. 117—76 P 6 Claims

ABSTRACT OF THE DISCLOSURE

A novel composite article of a phenolic resin foam adhered to an inherently water vapor pervious covering and impregnated with a tar, bitumen or vinyl, acrylic or phenolic polymer, whereby to decrease the porosity and increase the adhesion strength. This product is made by foaming a phonolic resin in contact with a porous covering material, suitably paper; hardening and setting the resin foam; impregnating and coating this foam-covering material article with one of the recited impregnants in liquid form; and then drying the product.

---

The present invention deals with a process for improving the adhesive strength of coverings on phenolic resin foam materials while simultaneously reducing the permeability of the phenolic resin foam materials provided with such covering to water vapor.

A covering for phenolic resin foams must satisfy a number of requirements: it must be impermeable to water vapor penetration from the outside, but at the same time it must permit the escape of the water vapor that is released during the setting of the phenolic resin foam. Furthermore, however, the coverings must also be firmly bonded to the foam and must not spall or be easily loosened therefrom.

Suitable materials which are substantially impermeable to water vapor are, for example, impregnated papers, plastics or metal foils. These materials have the disadvantage, however, that it is usually difficult to bond them to the foam, since they do not permit the water that is generated in the phenolic resin foam during the setting process to diffuse away.

On the other hand, porous, fibrous materials which are permeable to water vapor, such as paperboard, soda kraft paper or non-woven fabrics, do have satisfactory adhesion to phenolic resin foams.

Coverings made of these materials constitute protection for the brittle phenolic resin foam, but the permeability of these substances to water vapor, for example, is still too great, so that boards made of phenolic resin foams covered with these materials are unsuitable for use as outdoor insulation, for example.

It is therefore an object of this invention to provide a novel foam-form article of improved water-vapor imperviousness.

It is another object of this invention to provide such a novel article as a composite article of a phenolic resin foam and a covering material having improved adhesion therebetween.

It is a further object of this invention to provide a method of making such article.

Other and additional objects of this invention will become apparent from a consideration of this entire specification, including the claims hereof.

A process has now been discovered for the manufacture of phenolic resin foam materials having fibrous, water-vaporproof and firmly adherent coverings, which process comprises providing a porous, fibrous, non-vaporproof covering on a phenolic resin foam, impregnating and coating said foam, after the foaming and setting process of the resin is completed, with solutions or emulsions or melts of:

(a) Tar-containing or bituminous materials; or
(b) Thermoplastic polymers and/or copolymers of monomers containing vinyl and/or acrylic groups; or
(c) Condensation products of phenols and aldehydes, suitably resoles.

at temperatures between 20 and 100° C.; and then drying the impregnated and coated covered phenolic resin foam.

It has surprisingly been found that the impregnation and coating of a foamed phenolic resin, after such has been covered with a water vapor permeable material with the stated substances, performed after the resin foaming and setting process, considerably improves the adhesion of the water vapor permeable coverings, and at the same time decreases the permeability of the covering to water vapor.

The term "tar-containing materials" refers to substances produced as residues in the dry distillation of hard or soft coal, brown coal, peat or wood. Examples of these materials are tar and the substances derived therefrom, such as pitch or road tar.

The term "bituminous materials" is intended to mean the dark-colored, semi-solid, fusible hydrocarbon mixtures which are obtained by the mild refining of petroleum, which have a molecular weight of about between 300 and 3,000, and those components of brown coal, oil shale and natural asphalt which are soluble in carbon disulfide.

Particularly suitable solvents for these substances are either the liquid components produced in the distillation and/or hydrogenation of coal or crude tar, or the light oil or benzol which is obtained therefrom. However, the highly volatile distillation products of petroleum can also be used as solvents. Examples of these materials are distillate benzines and the solvents obtained therefrom. Also usable, of course, as solvents for the tar-containing and bituminous materials, are certain compounds, usually hydrocarbons, boiling in the 50 to 150° C. temperature range which are conventionally used as solvents for tar or bitumen.

Suitable emulsions of tar-containing or bituminous substances are aqueous emulsions to which small amounts of one or more suitable emulsifiers, such as soap, are added for stabilization.

The thermoplastic polymers or copolymers based on monomers containing vinyl and/or acrylic groups that can be used according to the invention are those polymers which form solutions in conventional solvents, having a solid matter content ranging from about 20 to 60%. These polymers and/or solutions thereof can contain one or more plasticizers if desired. It is preferred to use polymers having a relatively low molecular weight, preferably ranging between 10,000 and 60,000.

Resoles, which are formed by the condensation of phenols with aldehydes, are those which form through the condensation of one mole of an alkyl-substituted or unsubstituted phenol with 1 to 3 moles of aldehydes in an alkaline medium, followed by removal of the water by distillation until the desired solid resin content is achieved. A requirement for the use of these resoles is that they be impregnatable into the phenolic resin foamed into the coverings.

The fibrous, non-vaporproof, porous covering material is preferably a paper of good absorbency, such as gray pasteboard or soda kraft paper. Also usable are woven and non-woven fabrics of inorganic or organic, synthetic or natural fibers. This covering material is applied to the surface of the phenolic resin foam by conventional methods. This application can be performed either continuously—e.g., in a double-band press—or discontinuously. In the case of the continuous bonding of the phenolic resin foam with the covering, it is desirable that the process be such that the phenolic resin is placed between two continuous webs of suitable paper delivered from supply rolls, and then the resin, covered by the paper, passes through a double-band press heated to 60–80° C. The liquid phenolic resin then foams and adheres to the coverings, filling up the space between the upper band and the lower band, while simultaneously hardening.

After the foaming and setting of the phenolic resin, the still hot sandwich of phenolic resin foam and covering is passed through a bath containing the desired impregnating agent.

The discontinuous bonding of the phenolic resin foam to the covering material is performed in the following manner: A cavity of the desired board or block size is lined with the covering material, the foamable phenolic resole resin is introduced into the cavity and is foamed and set in the cavity. After the covered phenolic resin foam has been taken out of the mold, it is impregnated with the desired impregnating agent according to this invention.

The impregnation can be performed not only by immersion but also by brushing or spraying the solutions or emulsions of the impregnating agent onto the covered resin foam.

According to the invention, the foamable phenolic resin is preferably a resole and includes products of the condensation of one mole of a phenol with one to three moles of an aldehyde. The condensation takes place in an alkaline medium. The phenols can be not only phenol itself but also its homologs and alkyl substitution products, such as resorcinol, pyrocatechol, cresols, xylenols, or mixtures of these compounds. The aldehydes reacting with the phenols include formaldehyde, compounds which break down to formaldehyde (e.g., paraformaldehyde or trioxane), acetaldehyde, furfural, hexamethylenetetramine, as well as mixtures of these compounds.

After the condensation of the two reagents, the water that forms is distilled out, preferably in vacuo, down to a residual quantity which corresponds to suitable viscosity ranging between about 2,000 and 10,000 cp. or a suitable resin content (50–80%). The pH is adjusted, if desired or required, to a value greater than 4.

The foaming and setting of the phenolic resole resin is performed by the addition of known blowing agents and hardeners. Preferred blowing agents are: chlorinated fluoromethanes, n-pentane, petroleum ether, methylene chloride or ethylene dichloride. However, solid blowing agents, such as alkali metal and alkaline earth metal carbonates, can be used. The hardeners are mainly aromatic sulfonic acids whose sulfonic acid radical is directly on the benzene ring, an example being p-toluenesulfonic acid. Other usable hardeners are, for example, hydrochloric acid, sulfuric acid, or phosphoric acid.

It should be understood that forming the phenolic resin, foaming the phenolic resin, setting the phenolic resin, and initially adhering the porous covering to the foamed phenolic resin are per se conventionally accomplished.

This invention is illustrated by the following examples which are non-limiting, and in which parts and percentages are expressed by weight unless specified to the contrary.

EXAMPLE 1

In a continuousy operating conventional proportioning and mixing machine, a liquid, foamable phenolic resin mixture is prepared. It consists of 100 parts by weight of phenol-formaldehyde resin (prepared by the condensation of 143 parts by weight of phenol with 228 parts of a 30% aqueous formaldehyde solution with the addition of 0.715 part by weight of NaOH, at 100° C., followed by distillation removal of the water down to a solid resin content of about 76%), 4.8 parts by weight of n-pentane as blowing agent, and 13.2 parts of a hardening mixture, which itself consists of 10.0 parts by weight of p-toluenesulfonic acid finely pulverized 20.0 parts of finely pulverized boric acid, and 0.2 part of $SiO_2$. With an output of about 2.5 kg./min., this phenolic resin mixture is delivered between two webs of gray pulp-board (weight 240 g./m.$^2$) coming from supply spools, and runs through a double band press of 12 m. length heated to 70° C. and equipped with lateral restraints, and having a spacing of 25 mm. between the upper and lower bands. The liquid phenolic resin mixture thereupon foams up and fills out the space between the bands, adhering also to the upper web of gray pulpboard, and it hardens within 12 minutes.

After leaving the double band press the continuous sandwich is conventionally cut to size by lateral and cross trimmers while still at a temperature of about 50° C. The individual cut panels are then run through a bitumen immersion bath consisting of a solution of distillation bitumen with a softening point of 67 to 72° C. in a test benzene (B.P. 155–158° C.). The drying of the panels is performed substantially by their own heat and can be expedited in a hot air drying tunnel (circulating air temperature 50° C.). For comparative measurements, panels covered with gray pulpboard were prepared but not coated with bitumen.

The strength of adhesion of the covering materials to the foam panels was determined by a peeling test performed on 4 specimens of each type, 30 mm. wide. At the end of each specimen the covering material was raised for a length of 5 cm. to enable it to be clamped in the test apparatus. The stripping was continued at a rate of 100 mm. per minute. In the following table are given the forces required in order to strip the covering from the foam. The individual values were determined on the basis of the force-time diagrams recorded during the stripping.

TABLE 1

[Strength of adhesion determined by the stripping test (kp.)]

| Gray pulpboard | Not bitumen coated after preparation | | Bitumen coated after preparation (completely impregnated) | |
| --- | --- | --- | --- | --- |
| | Average | Range | Average | Range |
| Top | 0.65 | (0.60–0.70) | 0.85 | (0.5–1.0) |
| Bottom | 0.67 | (0.64–0.76) | 1.00 | (0.86–1.2) |
| Bulk density of foam, g./cc. | 0.08 | | 0.064 | |

EXAMPLE 2

A liquid, foamable phenolic resin mixture is prepared in a continuously operating conventional proportioning and mixing machine. It consists of 100 weight-parts of the phenol-formaldehyde resin of Example 1, 4.8 weight-parts of n-pentane as blowing agent, and 13.2 weight-parts of a hardener consisting of 40% sulfuric acid, 40% p-toluenesulfonic acid, and 20% water, by weight. With an output of about 2.5 kg./min. this phenolic resin mixture is delivered between two webs of soda kraft paper (weight 150 g./m.$^2$) continuously fed from supply spools, and then it is foamed as in Example 1.

After leaving the double band press and being cut and trimmed in a conventional manner, the laminated phenolic foam resin panels were run through an impregnating bath of the following composition:

Parts by weight

Phenol formaldehyde resin (viscosity 2800 cp., solids
content approximately 72%) _____ 100
Ethanol _____ 70
Hardener consisting of equal parts of p-toluenesul-
fonic acid and water _____ 20

The drying of the impregnated panels is performed substantially by a hot air drying tunnel with an air temperature of about 70° C.

In order to make comparative measurements, substantially identical panels laminated with soda kraft paper in the same way were again prepared from phenol formaldehyde resin, but the covering was not impregnated.

The strength of adhesion of the two coverings was determined in the same manner as in Example 1. The results are given in Table 2.

TABLE 2
[Strength of adhesion determined by the stripping test (kp.)]

| Soda kraft paper | Not bitumen coated after preparation | | Impregnated after preparation, using phenol-formaldehyde resin | |
|---|---|---|---|---|
| | Average | Range | Average | Range |
| Top | 0.60 | (0.55–0.67) | 0.95 | (0.89–1.00) |
| Bottom | 0.62 | (0.55–0.69) | 1.10 | (0.90–1.20) |
| Bulk density of foam, g./cc. | 0.075 | | 0.07 | |

What is claimed is:

1. In the process of producing a composite article of a phenol-aldehyde resin foam with a porous fibrous covering material by foaming such resin in contact with such covering material, thereby adhering said foam and said covering material together, and hardening and setting said foam; the improvement whereby increasing the adhesion strength between said covering and said foam and decreasing the porosity of said covering, which comprises coating and impregnating at least a covering layer of said composite article, after said foam has hardened and set, at about 20 to 100° C. with a liquid form impregnant composition comprising a tar material or a bituminous material and then drying the impregnated and coated product.

2. An improved process as claimed in claim 1, wherein said liquid form impregnant is a solution or dispersion having a solids content of about 20 to 60 weight percent.

3. A composite article comprising a phenol-aldehyde foam adhered to a porous fibrous covering material which composite article is impregnated and coated with tar or bitumen.

4. An article as claimed in claim 3, wherein said foam is phenol-formaldehyde resin.

5. An article as claimed in claim 3, wherein said covering is paper.

6. An article as claimed in claim 3, wherein said covering is pulpboard.

References Cited
UNITED STATES PATENTS

| | | | |
|---|---|---|---|
| 3,290,260 | 12/1966 | Buccigross | 117—98 X |
| 3,360,415 | 12/1967 | Hellman et al. | 161—159 |
| 2,964,424 | 12/1960 | Mast | 117—98 |
| 3,470,016 | 9/1969 | Biles et al. | 117—98 |
| 3,536,575 | 10/1970 | Maitrot | 260—2.5 F X |
| 3,537,929 | 11/1970 | Keith et al. | 260—2.5 F X |
| 3,397,082 | 8/1968 | Podlipnik et al. | 117—158 |
| 3,537,951 | 11/1970 | Anderson et al. | 117—155 L X |

RALPH HUSACK, Primary Examiner

U.S. Cl. X.R.

117—76 T, 92, 155 L, 158, 161 L, 168; 156—79, 335, 337; 161—159; 260—2.5 F